(12) United States Patent
Cochran (10) Patent No.: US 12,521,774 B1
(45) Date of Patent: Jan. 13, 2026

(54) AUTOMATED PHARMACEUTICAL BOTTLE INFORMATION REMOVAL APPARATUS

(71) Applicant: John Winston Cochran, Boise, ID (US)

(72) Inventor: John Winston Cochran, Boise, ID (US)

(73) Assignee: Tangent Design LLC, Boise, ID (US)

( * ) Notice: Subject to any disclaimer, the term of this patent is extended or adjusted under 35 U.S.C. 154(b) by 0 days.

(21) Appl. No.: 19/063,128

(22) Filed: Feb. 25, 2025

(51) Int. Cl.
*B32B 43/00* (2006.01)
*B08B 9/08* (2006.01)

(52) U.S. Cl.
CPC ........... *B08B 9/083* (2013.01); *B32B 43/006* (2013.01); *Y10T 156/1153* (2015.01); *Y10T 156/1911* (2015.01)

(58) Field of Classification Search
CPC ............. B32B 43/006; Y10T 156/1153; Y10T 156/1911; B08B 9/083
See application file for complete search history.

(56) References Cited

U.S. PATENT DOCUMENTS

| | | | | |
|---|---|---|---|---|
| 4,944,832 A | * | 7/1990 | Abe | B08B 9/083 156/154 |
| 5,373,618 A | * | 12/1994 | Doyle | B08B 9/083 29/426.6 |
| 5,651,846 A | * | 7/1997 | Hurst | B29C 63/0013 156/247 |
| 9,352,366 B2 | * | 5/2016 | Yamada | B08B 9/083 |
| 9,738,003 B2 | * | 8/2017 | Flood | B29C 63/0013 |
| 10,486,409 B1 | * | 11/2019 | Chang | B32B 43/006 |
| 2003/0070754 A1 | * | 4/2003 | Francis | B07B 1/14 156/709 |

* cited by examiner

*Primary Examiner* — Philip C Tucker
*Assistant Examiner* — Nickolas R Harm
(74) *Attorney, Agent, or Firm* — Plager Schack LLP; Mark H. Plager; Stephen Hallberg (57) ABSTRACT

An automated pharmaceutical bottle label information removal system is disclosed that removes protected health information (PHI) printed on labels of prescription pharmaceutical bottles. The system uses heat to automatically remove the PHI from the labels. The heat applied by the system is relatively low, making it safe in hospitals, pharmacies, and other medical locations. When heat is applied, the system removes the PHI from the labels by heat-induced blackout redaction. To entirely blacken out the label and redact the PHI, the system automatically aligns and rotates the bottle on roller wheels while heat from a heat bar is applied to the surface of the bottle along the thermal adhesive label. As the bottle rotates, the heat from the heat bar would be evenly applied to the thermal adhesive label, resulting in blackout redaction of the entire label, including the PHI printed on the label.

10 Claims, 7 Drawing Sheets

AUTOMATED PHARMACEUTICAL BOTTLE INFORMATION REMOVAL APPARATUS

BACKGROUND

Embodiments of the invention described in this specification relate generally to information protection devices, systems, and methods, and more particularly, to removing information printed on labels of prescription pill bottles.

Under Health Insurance Portability and Accountability Act (HIPAA) regulations, healthcare facilities and retail pharmacies must remove Protected Health Information (PHI) from prescription pill bottles before disposal. This is required to be compliant with HIPAA regulations. The majority of prescriptions are printed on thermal adhesive labels which are difficult to remove from bottles by hand and cannot be adequately covered with pen or marker ink. The current industry standard is to utilize an open flame lighter to heat the label and black out the patient information which is an unsafe practice, especially in facilities with medical oxygen.

There are some other existing options in the field, but they rely on using abrasives or blades to remove labels. This is not automated or even easy to do.

Therefore, what is needed is a way to safely and automatically remove the protected health information from prescription pharmaceutical bottles.

BRIEF DESCRIPTION

A novel automated pharmaceutical bottle label information removal system is disclosed that removes protected health information (PHI) printed on thermal adhesive labels of prescription pharmaceutical bottles. In some embodiments, the automated pharmaceutical bottle label information removal system uses heat to automatically remove the PHI from the labels. The heat applied by the automated pharmaceutical bottle label information removal system is relatively low, making it safe in hospitals, pharmacies, and other medical locations. When heat is applied, the automated pharmaceutical bottle label information removal system removes the PHI from the labels by heat-induced blackout redaction. To entirely blacken out the label and redact the PHI, the automated pharmaceutical bottle label information removal system automatically aligns and rotates the bottle on roller wheels while heat from a heat bar is applied to the surface of the bottle along the thermal adhesive label. As the bottle rotates, the heat from the heat bar would be evenly applied to the thermal adhesive label, resulting in blackout redaction of the entire label, including the PHI printed on the label.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the automated pharmaceutical bottle label information removal system are described. However, it will be clear and apparent to one skilled in the art that the invention is not limited to the embodiments set forth and that the invention can be adapted in design and form to provide similar functionality in obscuring or blackening out information printed on labels of pharmaceutical bottles or other bottles or containers with protected information including, without limitation, protected health information or other sensitive, protected, or private information. Also, while the invention is mainly referred to as the automated pharmaceutical bottle label information removal system, the examples and details below may also refer to the invention in other ways, such as an "automated pharmaceutical bottle label information removal machine," an "automated pharmaceutical bottle label information removal apparatus", or an "automated pharmaceutical bottle label information removal device". For purposes of the present disclosure, therefore, such descriptions and examples referring to the automated pharmaceutical bottle label information removal system as a machine, an apparatus, and a device are understood to mean the same as the automated pharmaceutical bottle label information removal system.

Embodiments of the invention described in this Specification include an automated pharmaceutical bottle label information removal system. The automated pharmaceutical bottle label information removal system of some embodiments is configured to remove protected health information (PHI) printed on labels of prescription pharmaceutical bottles. In some embodiments, the PHI is printed on thermal adhesive labels of prescription pharmaceutical bottles. In some embodiments, the automated pharmaceutical bottle label information removal system uses heat to automatically remove the PHI from the labels. The heat applied by the automated pharmaceutical bottle label information removal system is relatively low, making it safe in hospitals, pharmacies, and other medical locations. Additional benefits of utilizing a heat bar to remove the PHI from labels include quiet operation with no dust or debris created. Furthermore, the heat bar would be easy to maintain, requiring little maintenance and servicing.

In some embodiments, the automated pharmaceutical bottle label information removal system removes the PHI from the labels by blackout redaction. In some embodiments, the automated pharmaceutical bottle label information removal system utilizes a heat bar, adjustable jaws, and roller wheels that would accommodate the full range of prescription bottle sizes and shapes. In some embodiments, the automated pharmaceutical bottle label information removal system automatically aligns an empty bottle on the roller wheels and rotates the bottle by drive wheels while heat from the heat bar is applied to the surface of the bottle. As the bottle rotates, the heat from the heat bar would be evenly applied to the thermal adhesive label, resulting in blackout redaction of the entire label, including the PHI printed on the label. After the label turns entirely black, the bottle can be removed. In this way, the automated pharmaceutical bottle label information removal system ensures that PHI can be quickly and safely removed from prescription pill bottles labeled with thermal paper.

As stated above, healthcare facilities and retail pharmacies must remove PHI from prescription pill bottles before disposal to be compliant with HIPAA regulations. However, thermal adhesive labels (on which PHI is typically printed) are difficult to remove by hand and cannot be adequately covered with pen or marker ink, leaving subtle indications of information that risks non-compliance with HIPAA regulations. While the current industry standard is effective, it involves the unsafe practice of applying open flames from a lighter to heat the label and black out the patient information. Fire is especially dangerous in facilities with medical oxygen, such as hospitals. Thus, the current state of the art is inadequate in effectively and safely complying with HIPAA regulations that require the removal of PHI. Embodiments of the automated pharmaceutical bottle label information removal system described in this specification solve such problems by providing a way to quickly and safely remove PHI from prescription pill bottles labeled with thermal paper. In particular, the automated pharmaceutical bottle label information removal system utilizes adjustable jaws with passive roller wheels that accommodate a wide range of prescription bottle sizes and shapes. In practice, an empty bottle with PHI on a label would be automatically aligned by the automated pharmaceutical bottle label information removal system so that heat is applied to the label. Once aligned, the automated pharmaceutical bottle label information removal system would automatically rotate, by way of drive wheels, the bottle (resting between the roller wheels) while a heat bar is applied to the exterior of the bottle around the area of the alignment to the label. As the bottle rotates, the heat bar would completely remove PHI by evenly heating the entire label and causing it to go entirely black.

Embodiments of the automated pharmaceutical bottle label information removal system described in this specification differ from and improve upon currently existing options. For instance, the current standard in most retail pharmacies and medical facilities is to use a hand held open flame lighter to heat labels to remove PHI. Most thermal labels activate at a temperature of at least fifty-five degrees Celsius (55° C., which when converted to Fahrenheit is about 131° F.) and paper combusts (or ignites) at approximately two-hundred thirty-three degrees Celsius (233° C., which when converted to Fahrenheit is 451° F.). By utilizing a maximum heat-bar temperature of sixty degrees Fahrenheit (60° F.), the automated pharmaceutical bottle label information removal system of the present disclosure can be safely used in both home and clinical settings.

Furthermore, abrasives are often used in current practices to remove PHI from bottle labels. However, abrasives are messy and can produce particulate which is unsafe in a healthcare setting. Additionally, abrasives can become clogged due to label debris build-up and adhesive. Another commonly used method for removing PHI involves the use of blades. However, blade are not reliable for removing labels and require a great deal of maintenance and upkeep.

By contrast, the automated pharmaceutical bottle label information removal system described in the present disclosure comes equipped with a heat bar that is used to remove PHI from labels. Also, applying heat from the heat bar to the label is a relatively quiet operation. Thus, the automated pharmaceutical bottle label information removal system is configured to be operationally quiet while also minimizing the creation and spread of dust and debris in the area. Of vital importance, however, is the fact that the automated pharmaceutical bottle label information removal system operates at relatively low temperatures, specifically, around 60° F., which makes it safe in hospital settings, whether or not compressed oxygen, oxygen tanks, or other flammable gases are present or nearby. Moreover, the heat bar does not require a lot of ongoing maintenance or servicing.

The automated pharmaceutical bottle label information removal system of the present disclosure may be comprised of the following elements. This list of possible constituent elements is intended to be exemplary only and it is not intended that this list be used to limit the automated pharmaceutical bottle label information removal system of the present application to just these elements. Persons having ordinary skill in the art relevant to the present disclosure may understand there to be equivalent elements that may be substituted within the present disclosure without changing the essential function or operation of the automated pharmaceutical bottle label information removal system.

Specifically, the automated pharmaceutical bottle label information removal system comprises (i) a plurality of spring loaded jaws (e.g., four spring-loaded jaws), each spring-loaded jaw comprising a plurality of passive roller wheels (e.g., two passive roller wheels), (ii) a motor (attached to a base) with a linear drive-line and turning gears that control the drive-line, to which multiple (rubberized) drive wheels attach, (iii) a thermostatically controlled heat bar which extends/retracts with variable pressure for adjusting to a surface of a bottle (the "bottle surface"), (iv) a silicone sheet to cover the heat bar, (v) an LED display screen configured to visually output information such as, without limitation, operational status, rolling speed, heat bar temperature, etc., (vi) scroll buttons for display and adjusting speed and temperature, (vii) a power switch (on/off toggle switch or other power switch or button, etc.), (viii) indicator lights that illuminate to indicate whether the system is on or off, whether the heat bar temperature is below a preferred temperature, at the preferred temperature, or above the preferred temperature, and whether the system is in-use or notification, (ix) a start button, (x) an alignment plate for the top/lid of bottle, and with (or without) optional hinge to open an area for ejection of a pill bottle by the plunger, (xi) a spring-loaded alignment plate for securing a bottom portion or lip of the top/cap of the bottle, (xii) an optional plunger to automatically kick bottle out of device into a waste container or collection bin, etc., (xiii) an optional chute to direct the bottle kicked out by the plunger into the waste container, collection bin, or other collection bag, etc. (xiv) an optional feeder for placing multiple bottles into a hopper attachment, thereby allowing for bulk function, (xv) an optional wireless communication device (with at least a WiFi module and, optionally, Bluetooth or other wireless communication modules) that is configured for wireless connection by a mobile device or other computing device to access a control interface of the system (such as a "system control interface and app"), integrations, web controls, and/or readouts, (xvi) a circuit board and controller module in which the circuit board is equipped with a watch battery for memory and the wireless communication device and the controller module are attached/assembled to control all functions (also referred to as the "circuit board controller"), (xvii) an optional laser-eye to evaluate bottle for full PHI removal, (xviii) an audio/sound speaker for audibly outputting an audio alarm, a tone, an automated voice prompting, etc., (xix) a counter that is configured to function as a bottle counter to track the number of bottles being processed by the system, (xx) an hour meter, (xxi) a small (vented) fan to help prevent overheating and maintain function, (xxii) a base/bottom of the system (also referred to as the "platform base"), (xxiii) rubberized feet under the base of the system, (xxiv) an optional outer body, housing, and/or cover, (xxv) an optional hinged dust cover, (xxvi) an alignment plate (or "U-shaped alignment plate") to determine cap ledge, (xxvii) an optional collection bag or container attachment for collecting bottles from chute.

The various elements of the automated pharmaceutical bottle label information removal system of the present disclosure may be related in the following exemplary fashion. It is not intended to limit the scope or nature of the relationships between the various elements and the following examples are presented as illustrative examples only.

By way of example, FIGS. 1-6 conceptually illustrate an automated pharmaceutical bottle label information removal system 10. The automated pharmaceutical bottle label information removal system 10 shown in these figures is configured, by design, to operate on pharmaceutical or other small bottles laid down in a horizontal orientation to allow for circular rolling of the bottle. However, it is possible for the automated pharmaceutical bottle label information removal system 10 to be designed in a different way to operate vertically on pharmaceutical or other small bottles standing upright (vertically oriented) and turned in a circular motion to blacken out the label on the bottle.

Figure 1:
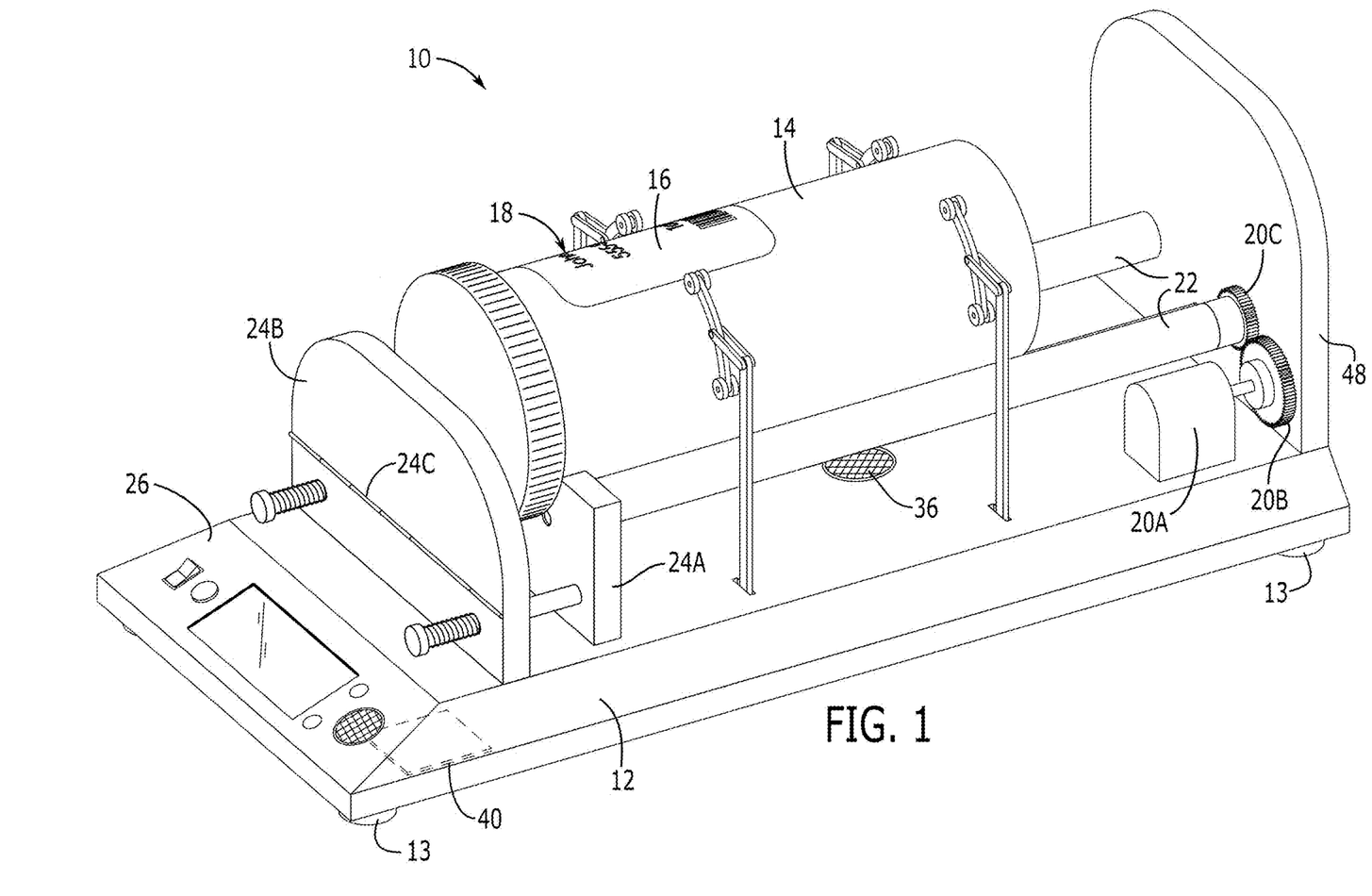
FIG. 1 conceptually illustrates a side perspective view of an automated pharmaceutical bottle label information removal system with a pharmaceutical pill bottle positioned for blackout redaction of personal health information (PHI) printed on a thermal adhesive label in some embodiments.

Referring first to FIG. 1, a side perspective view of the automated pharmaceutical bottle label information removal system 10 is conceptually illustrated. As shown in this figure, the automated pharmaceutical bottle label information removal system 10 is operating on a pharmaceutical bottle 14 ("pill bottle 14") with a printed label 16 that includes personal health information 18. The automated pharmaceutical bottle label information removal system 10 itself comprises a base 12, a plurality of feet 13, a motor 20A, a driving gear 20B, a driven gear 20C, a plurality of rollers 22, an alignment plate 24A, a spring-loaded alignment plate 24B, a hinge 24C, a control interface 26, a small fan 36, a circuit board 40 (also referred to as the "controller 40"), and a rear plate 48.

In some embodiments, the base 12 of the automated pharmaceutical bottle label information removal system 10 sits on the plurality of feet 13. Specifically, the plurality of feet 13 are positioned along a bottom side of the base 12, thereby elevating the automated pharmaceutical bottle label information removal system 10 slightly up from a ground surface to allow air circulation under the bottom of the base 12 of the system. In some embodiments, the plurality of feet 13 comprise a plurality of rubberized feet 13. In some embodiments, the plurality of rubberized feet 13 comprises four feet.

In some embodiments, the motor 20A is attached along a top side of the base 12 with a linear drive-line connected to drive gears for rotating the drive wheels. In some embodiments, there are two drive gears, namely, a driving gear 20B and a driven gear 20C, which are attached to the rear plate 48. In some embodiments, the plurality of rollers 22 comprise two rollers 22. In some embodiments, the two rollers 22 comprise an active roller 22 attached to the driven gear 20C and a passive roller 22. The active roller 22 connected to the driven gear 20C is configured to rotate when the motor 20A operates to turn the driven gear 20C. The other roller 22 shown in this figure is the passive roller 22, which passively rotates as the pill bottle 14 turns via rotation of the active roller 22. In a preferred embodiment, the rollers 22 are rubberized to provide grip for turning the pill bottle 14, such as when the rollers 22, by attachment to the drive-line, rotate the bottle.

In some embodiments, the alignment plate 24A comprises a U-shaped alignment plate 24A. In some embodiments, the U-shaped alignment plate 24A and the spring-loaded alignment plate 24B are configured to alight to the top/lid of the bottle 14 and the underside of the cap to determine the start point of the label-removal area. An optional spring-loaded alignment plate (not shown in these figures) for the bottom of the pill bottle 14 may apply bottom pressure to the bottle 14 during rotation. In some embodiments, the spring-loaded alignment plate 24B includes the hinge 24C for expelling the pill bottle 14 after blackening out the label 16. Specifically, the hinge 24C is configured to open up the area by bending the spring-loaded alignment plate 24B downward toward the control interface 26. In this way, the area near the cap of the bottle 14 gets opened up/freed for ejection of the pill bottle 14 by a plunger (not shown in this figure). An example of a plunger 44 is described below, by reference to FIG. 6. Note, however, that the plunger 44 is also an optional component, but may not be needed or used when a user manually removes the pill bottle 14. Thus, the spring-loaded alignment plate 24B does not have a hinge 24C in some embodiments of the automated pharmaceutical bottle label information removal system 10 which do not include the plunger 44.

The spring-loaded alignment plate 24B and hinge 24C are, therefore, designed to allow for automated ejection of multiple pill bottles 14 operated in sequence, with ejection of each occurring automatically after blackening out the label of the pill bottle 14. How this works is as follows: specifically, the top portion of the spring-loaded alignment plate 24B (above the hinge 24C) opens down toward the front (toward the control interface 26) to open up the area for ejection of the pill bottle 14 after a heat bar (not shown in this figure) completes blackout redaction of the PHI 18 printed on the label 16. An example of a heat bar 28 is described below, by reference to FIGS. 2-5. The blackout redaction of the PHI 18 would result in completely obscured label information. Generally, the obscured label information is not human or machine readable. An example of the obscured label information 30 is described below, by reference to FIG. 4.

In some embodiments, the small fan 36 is positioned along the base 12. The fan 36 is configured to circulate air during operation of the automated pharmaceutical bottle label information removal system 10. In this way, heat from the heat bar 28 is automatically dispersed, ensuring there is no overheating of the automated pharmaceutical bottle label information removal system 10 during operation. In some embodiments, the small fan 36 includes a passive vent for cooling at the bottom of the base 12. In this way, the small fan 36 is able to pull air through the passive vent and fan it upward toward the heat being generated by the heat bar.

In some embodiments, the control interface 26 provides an interface for powering on, configuring, operating, and obtaining information in connection with the automated pharmaceutical bottle label information removal system 10. Further details of the control interface 26 are described below, by reference to FIG. 2. In some embodiments, the control interface 26 is communicably connected to the controller 40. An example of a circuit board or controller 40 (or other equivalent electronic system) is described below, by reference to FIG. 7.

Figure 2:
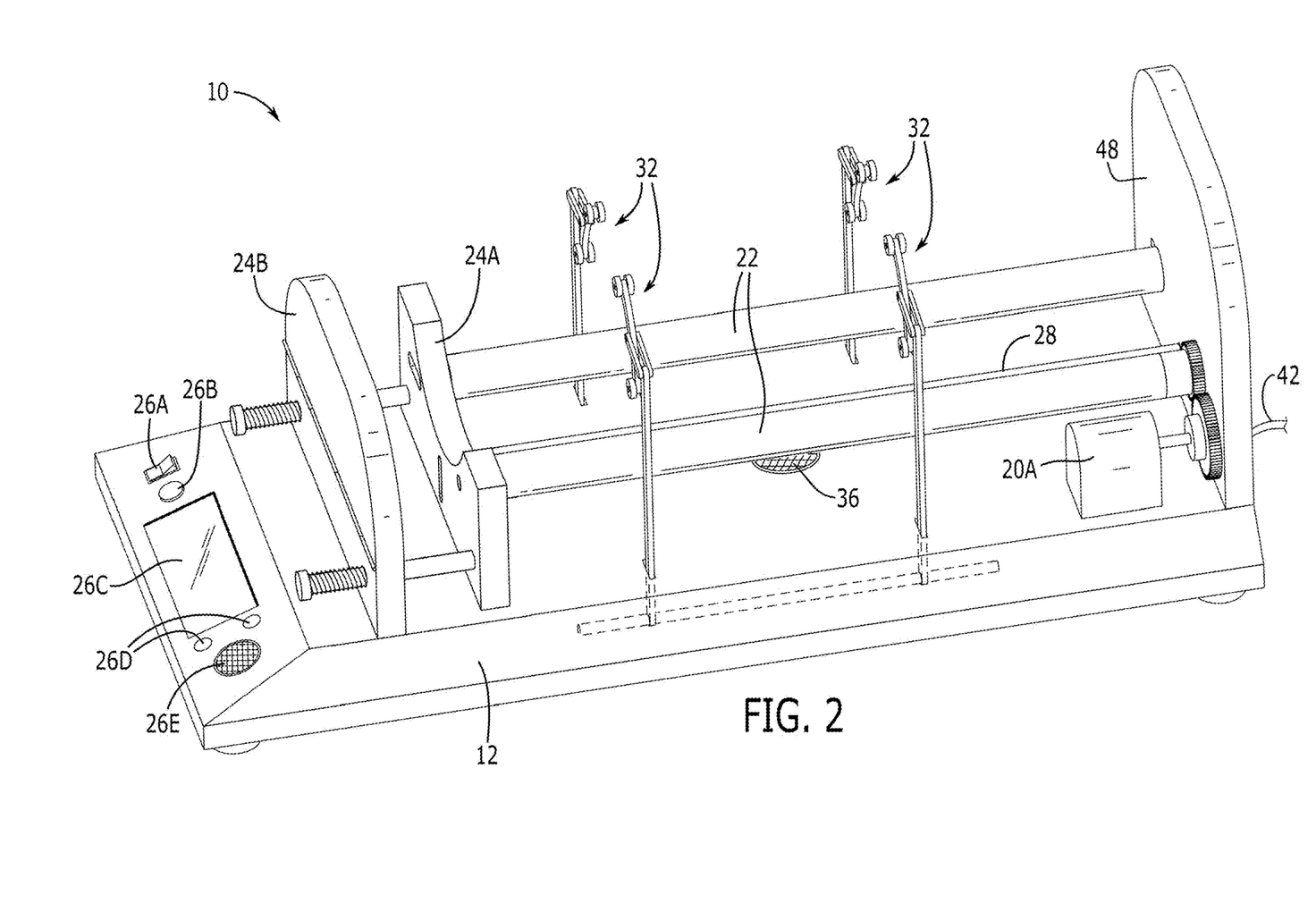
FIG. 2 conceptually illustrates another side perspective view of the automated pharmaceutical bottle label information removal system in some embodiments without the pharmaceutical pill bottle in place.

By way of example, FIG. 2 conceptually illustrates another side perspective view of the automated pharmaceutical bottle label information removal system 10 without the pharmaceutical pill bottle in place. The automated pharmaceutical bottle label information removal system 10 shown in this figure includes a plurality of spring-loaded crescent-shaped jaws 32 which are configured to open up (in an open configuration) to accept placement of a pill bottle 14 with a printed label 16 that includes personal health information 18 and close down (in a closed configuration). In some embodiments, the plurality of spring-loaded jaws 32 comprises four sets of spring-loaded jaws 32, and each of the spring-loaded jaws 32 comprises two passive roller wheels connected to adjustable arms at pivot points connected to upright shafts that connect to the base 12, thereby allowing for open configuration and closed configuration by closing down on the bottle 14 with shape adjustments for different bottle shapes and sizes, as needed. Thus, the spring-loaded jaws 32 are flexible to accommodate different shapes and sizes of bottles while being securely attached to the base 12 via the shaft and pivot-point connected adjustable arms. Furthermore, the plurality of spring-loaded crescent-shaped jaws 32 or some embodiments are spring loaded to open and close. The plurality of spring-loaded jaws 32 each comprise a plurality of passive roller wheels. Thus, when the pill bottle 14 is placed horizontally on the rollers 22, the plurality of spring-loaded crescent-shaped jaws 32 release tension to close down in the closed configuration, thereby securing the pill bottle 14 when the passive roller wheels come into contact on the surface of the bottle 14. The plurality of passive roller wheels 34 are described further below, by reference to FIG. 5. Furthermore, the spring-loaded jaws 32 and the passive roller wheels 34 are configured to adjust shape as needed for the passive roller wheels 34 to each make individual contact with the bottle 14. In this way, the automated pharmaceutical bottle label information removal system 10 can accommodate large, small, midsize bottles or any size bottle.

Additionally, the automated pharmaceutical bottle label information removal system 10 shown in this figure demonstrates an example of a heat bar. Specifically, the heat bar 28 is a thermostatically controlled heat bar 28. In some embodiments, the thermostatically controlled heat bar 28 is spring-loaded and is configured to move up and down along a heat bar travel slot (not shown in this figure) of the U-shaped alignment plate 24A. An example of a travel slot 38A is described further below, by reference to FIG. 5. In this way, the heat bar 28 is capable of lifting up to apply constant pressure to bottles regardless of shape/size. In some embodiments, tension adjustment for the heat bar is possible. Furthermore, a silicone sheet covers the heat bar 28 in some embodiments and provides a barrier between the heat bar 28 and the label 16 on the bottle 14, thereby preventing the heat bar 28 from sticking to the bottle/label.

In addition to the heat bar 28, the automated pharmaceutical bottle label information removal system 10 shows several controls and interface elements of the control interface 26. Specifically, the control interface 26 comprises power switch 26A, a start button 26B, a display screen 26C, a plurality of indicator lights 26D, and an audio speaker 26E.

In some embodiments, the power switch 26A comprises an on/off toggle switch. As shown in this figure, the power switch 26A is positioned along the control interface 26 of the automated pharmaceutical bottle label information removal system 10. Specifically, the power switch 26A is positioned along the control interface 26 near the display screen 26C. When the power switch 26A is turned on, the automated pharmaceutical bottle label information removal system 10 draws power from either a battery or through a power cord 42 (connected to, e.g., a wall outlet or other power source).

In some other embodiments, the power switch 26A is positioned near the rear of the automated pharmaceutical bottle label information removal system 10, such as along the back side of the rear plate 48. For instance, the power switch 26A may be positioned at the rear of the automated pharmaceutical bottle label information removal system 10 near the power cord 42, thereby providing electrical power from a wall socket, or external battery. As noted above, however, the automated pharmaceutical bottle label information removal system 10 may be powered by internal batteries (not shown) which are charged via the power cord 42. In such embodiments, the power cord 42 may be a universal serial bus (USB) charging cable configured to recharge the internal batteries.

In addition to the power switch 26A, the automated pharmaceutical bottle label information removal system 10 includes a start button 26B. In a preferred embodiment, the start button 26B is positioned near the front of the automated pharmaceutical bottle label information removal system 10, relatively nearby the display screen 26C along the control interface 26. However, in some other embodiments, the start button 26B may be disposed at the rear of the automated pharmaceutical bottle label information removal system 10.

In some embodiments, the display screen 26C is also positioned at the front of the automated pharmaceutical bottle label information removal system 10. In this figure, the display screen 26C is shown in the center of the control interface 26. In a preferred embodiment, the display screen 26C comprises a light emitting diode (LED) display screen 26C. In some other embodiments, the display screen 26C comprises another type of digital display. Examples of other digital display screens are described below, by reference to FIG. 7.

In some embodiments, LED display screen 26C includes a plurality of display screen (graphical) buttons to scroll through functions and adjust temperature, speed, and other functions. In some other embodiments, the plurality of buttons are nearby the LED display screen 26C, but are not graphical or displayed on or within the same area of the LED display screen 26C. Furthermore, the plurality of indicator lights 26D are provided at the front side (nearby the LED display screen 26C) to signal various aspects, modes, states, etc., of the automated pharmaceutical bottle label information removal system 10. For instance, a green indicator light 26D may be configured to demonstrate when the automated pharmaceutical bottle label information removal system 10 is at the preferred temperature ("at-temp") and is ready for operation. On the other hand, a yellow indicator light may indicate that the automated pharmaceutical bottle label information removal system 10 is warming up. Red may illuminate to indicate an error or a fault. The audio speaker 26E is another component located along the control interface near the front of the automated pharmaceutical bottle label information removal system 10 and is configured to audibly emit sound, tones, alerts, etc.

The controller circuit board 40, described above by reference to FIG. 1, is either attached to or embedded within the base 12 and controls multiple components (and their respective functions) including the hour meter, the audio speaker 26E, the counter, the motor 20A (and the speed of the motor, or "motor speed"), the heat bar 28 and the temperature of the heat bar, and the LED display screen 26C with all buttons and indicator lights 26D. The circuit board controller 40 also controls optional equipment including the plunger, the hopper, the laser eye, and the wireless communication device (and WiFi/Bluetooth modules). Internal wiring connects the circuit board controller 40 to the various components it controls.

Figure 3:
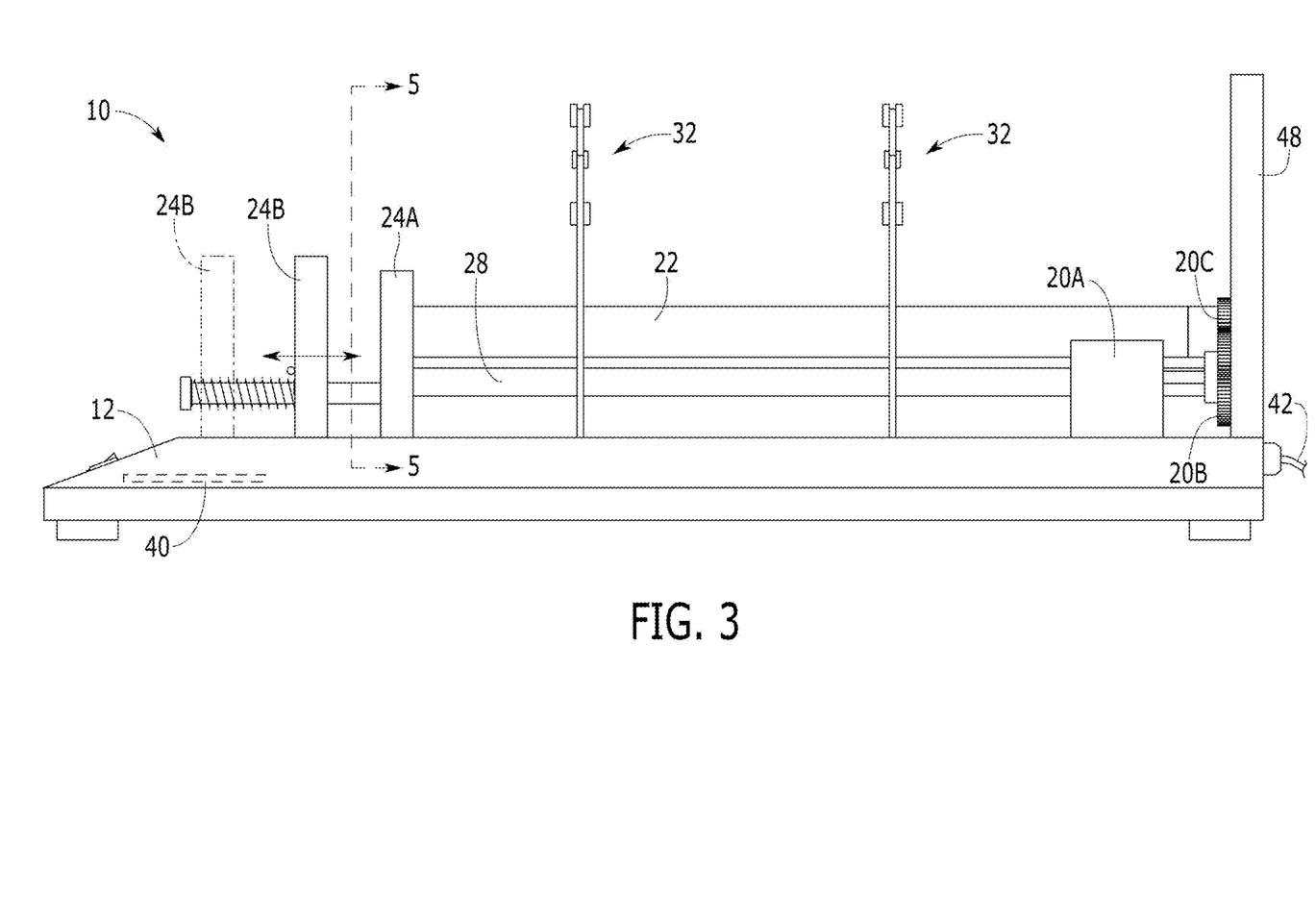
FIG. 3 conceptually illustrates a side elevation view of the automated pharmaceutical bottle label information removal system in some embodiments demonstrating movement of a spring-loaded alignment plate to accommodate placement of various sizes of pharmaceutical pill bottles.

By way of another example, FIG. 3 conceptually illustrates a side elevation view of the automated pharmaceutical bottle label information removal system 10 demonstrating movement of the spring-loaded alignment plate 24B to accommodate placement of various sizes of pharmaceutical pill bottles. Another view of this is further described below, by reference to FIG. 5.

Figure 4:
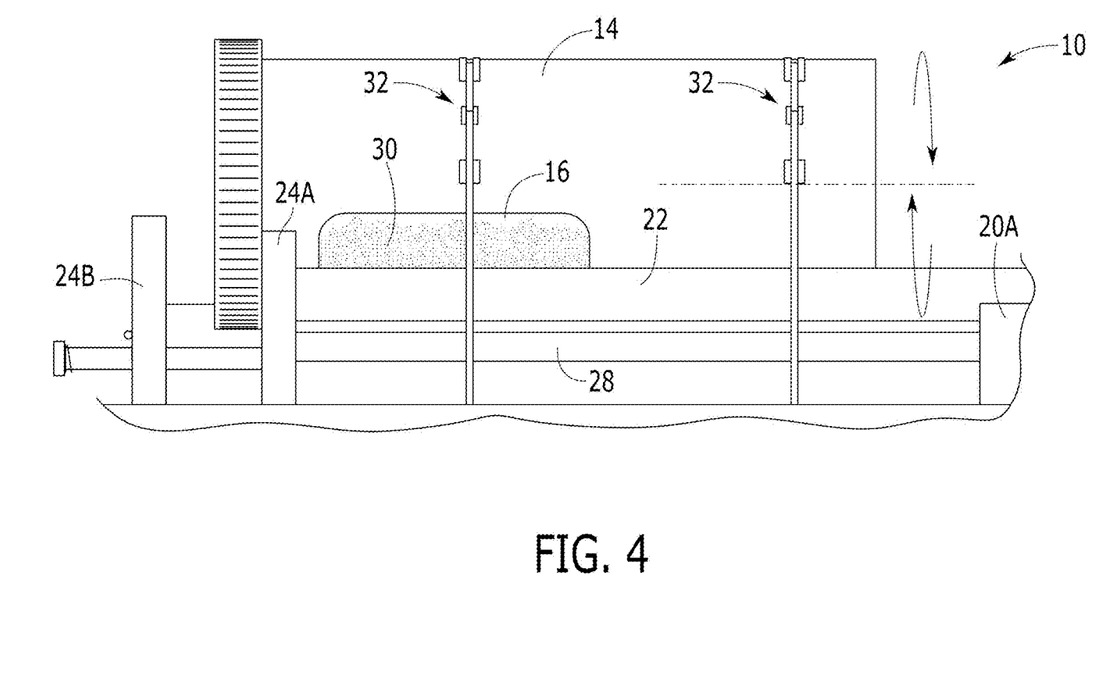
FIG. 4 conceptually illustrates another side elevation view of the automated pharmaceutical bottle label information removal system in some embodiments during usage while rotating a pharmaceutical pill bottle to perform blackout redaction of the PHI that entirely obscures the information on the label.

Turning to another example, FIG. 4 conceptually illustrates a side elevation view of the automated pharmaceutical bottle label information removal system 10 during usage while rotating a pharmaceutical pill bottle 14 to perform blackout redaction of the personal health information 16, which has the effect of entirely obscuring the information on the label—the obscured label information 30 (also referred to as the "obscured PHI label 30"). The way this happens is by heating up the heat bar 28 when the bottle 14 is placed on the rollers 22. The motor 20A operates to cause rotation of the active roller 22 which, in turn, rotates the pill bottle 14 in a circular manner, while it is held in place on the rollers 22 via closed configuration of the spring-loaded crescent-shaped jaws 32.

Also, the laser-eye described above optionally attaches to the side of the automated pharmaceutical bottle label information removal system 10 and performs a laser scan to "look" at the label 16 to ensure that the label 16 and information 18 are entirely blacked-out and obscured, such as demonstrated in this figure as the obscured label information 30. If the label 16 is not blacked out, or only partial blacked out (leaving only partial obscuring of the PHI 18), the laser-eye can detect the problem and the automated pharmaceutical bottle label information removal system 10 will indicate the problem via an audible and/or visually output alarm or notification/information. For instance, outputting an audible alarm through the audio speaker 26E, or visually outputting the alarm as a notification on the display screen 26C. Furthermore, the automated pharmaceutical bottle label information removal system 10 automatically stops the motor 20A and rotation of the bottle 14 when such an audible alarm sounds or an error/problem is detected by automated pharmaceutical bottle label information removal system 10.

Figure 5:
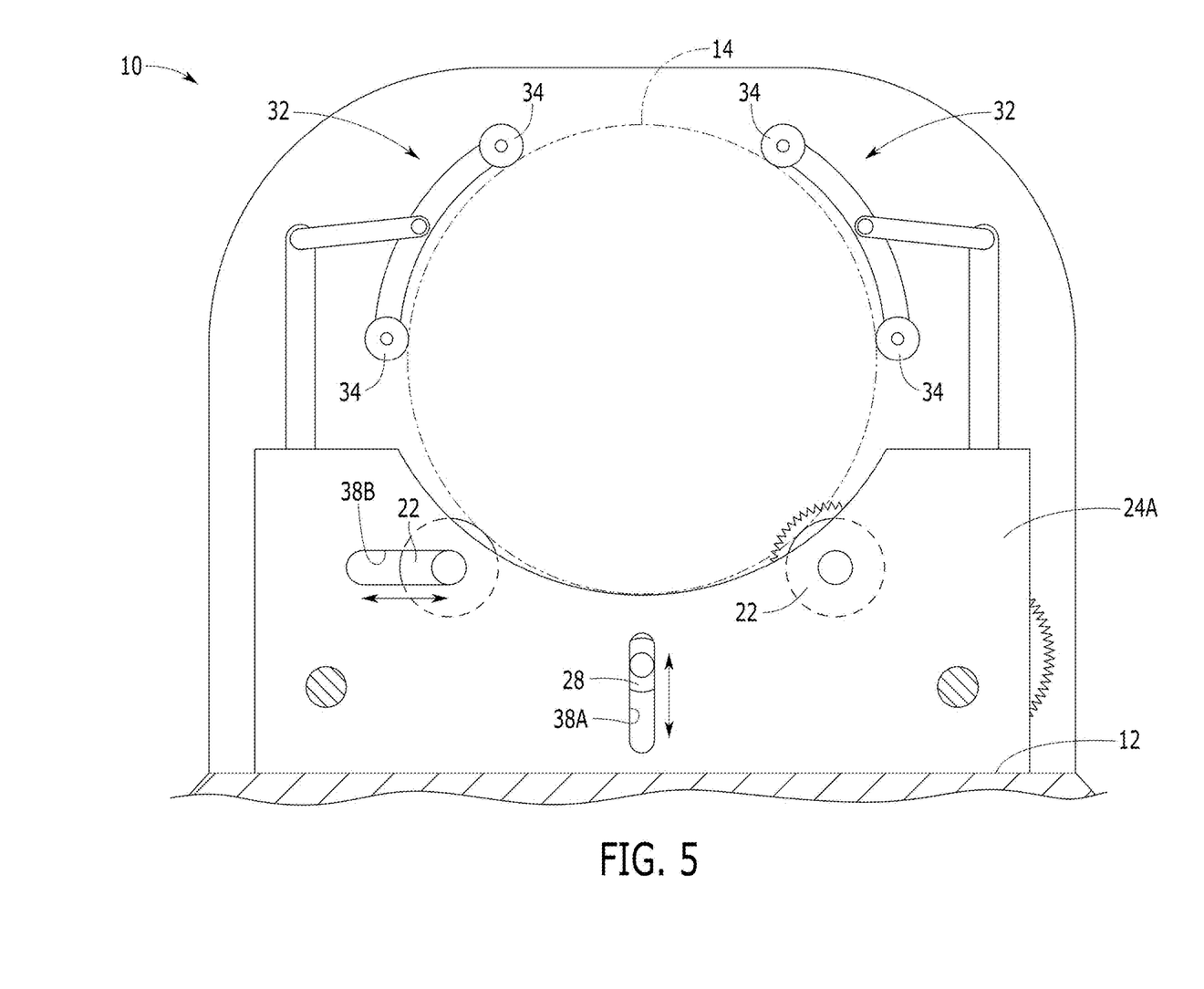
FIG. 5 conceptually illustrates a cross-sectional view of the automated pharmaceutical bottle label information removal system, taken along line 5-5 of FIG. 3.

By way of example, FIG. 5 conceptually illustrates a cross-sectional view of the automated pharmaceutical bottle label information removal system, taken along line 5-5 of FIG. 3. As shown in this figure, passive roller wheels 34 are connected to each set of spring-loaded crescent-shaped jaws 32. Additionally, a heat bar travel slot 38A and a roller travel slot 38B are cut out of the U-shaped alignment plate 24A. Specifically, the heat bar travel slot 38A allows for vertical (upward/downward) movement of the heat bar 28 and the roller travel slot 38B allows for lateral (horizontal) movement of the passive roller 22.

When the pill bottle 14 rotates, the label 16 and PHI 18 gets oriented toward the heat bar 28, which is raised up to the bottle 14 in a position to apply heat to the label as the bottle 14 rotates on the rollers 22. Thus, when applying heat to the label 16 on the pill bottle 14, the heat bar 28 is moved up toward the bottle 14. On the other hand, when the PHI 18 on the label 16 is blackened out (after heating is applied), the heat bar 28 moves down via the heat bar travel slot 38A since heat is no longer needed.

Furthermore, the heat bar travel slot 38A is configured to enable the heat bar 28 to lift up to apply constant pressure to the bottle 14 during its rotation and regardless of its shape/size. In some embodiments, tension adjustment for the heat bar is possible. Furthermore, in some embodiments, a silicone sheet covers the heat bar 28 in some embodiments and provides a barrier between the heat bar 28 and the label 16 on the bottle 14, thereby preventing the heat bar 28 from sticking to the bottle/label. In addition to the heat bar travel slot 38A, FIG. 5 also demonstrates a roller travel slot 38B which enables the passive roller 22 to move laterally, back and forth, thereby ensuring the automated pharmaceutical bottle label information removal system 10 can accommodate different sizes and shapes for the pill bottles 14 undergoing blackout redaction of the personal health information 18 printed on the label 16.

Figure 6:
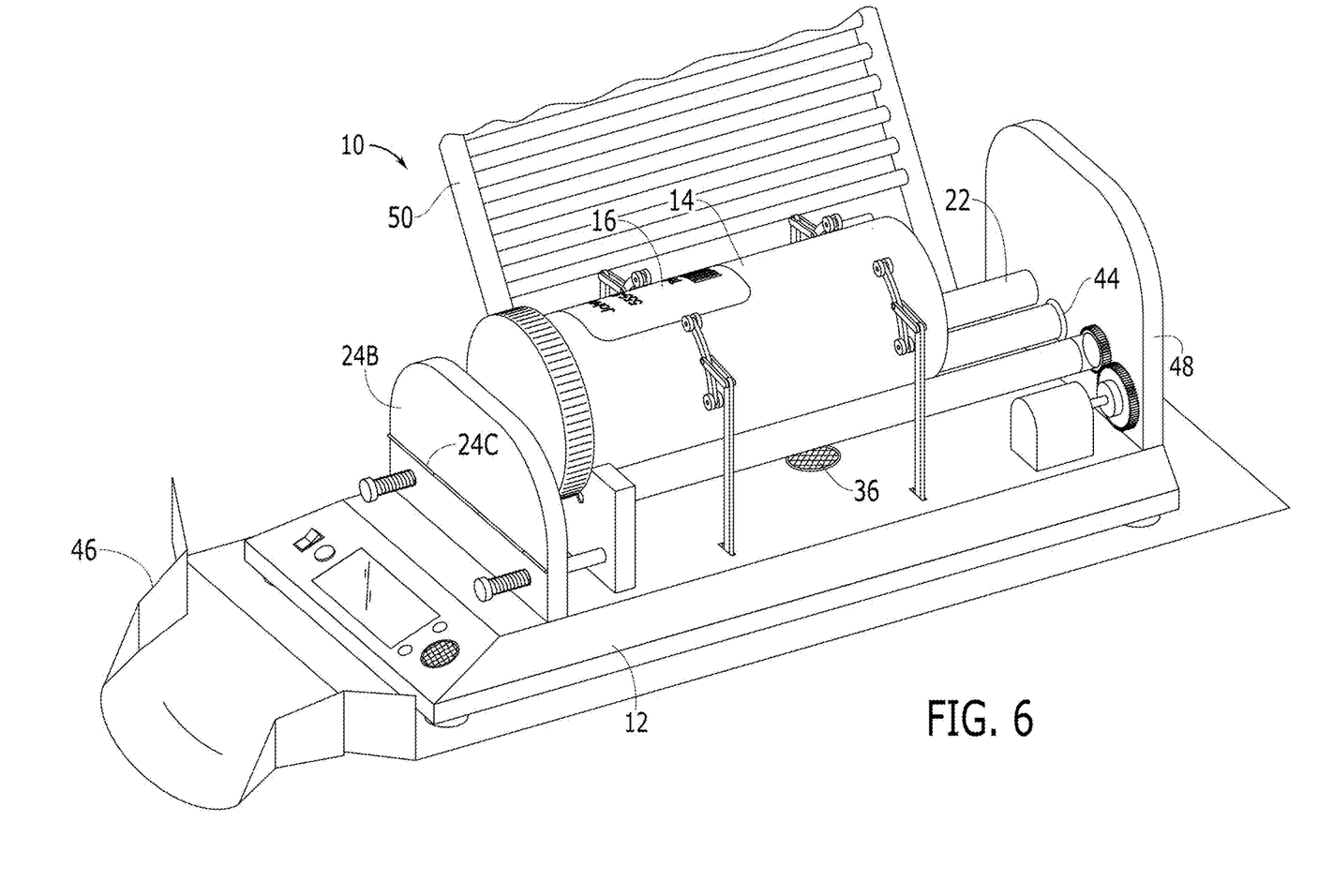
FIG. 6 conceptually illustrates a perspective view of the automated pharmaceutical bottle label information removal system with a collection container and other optional components attached.

By way of another example, FIG. 6 conceptually illustrates a perspective view of the automated pharmaceutical bottle label information removal system 10 with several optional elements. Specifically, the automated pharmaceutical bottle label information removal system 10 is optionally equipped with a plunger 44 that is configured to push the bottle 14 into the spring-loaded alignment plate 24B, which bends down at the hinge 24C as pressure from the plunger 44 is applied. Also shown in this figure is an optional chute 46 that can be attached to the front of the system 10 for collection of the pill bottle 14 after being ejected. In this way, the bottle 14 is ejected out the front of the system 10 by the plunger 44 action of pushing the bottle 14 out of the front of the automated pharmaceutical bottle label information removal system and down the optional chute 46, which itself may have an optional collection container attached, such as a collection box, waste bin, bag, etc. Another component shown in this figure is an optional hopper 50 (or other conveyance mechanism), which attaches to the side and holds multiple bottles which are automatically fed into the automated pharmaceutical bottle label information removal system 10.

In some embodiments, an outer body (not shown) optionally covers all of the inner workings and protects the automated pharmaceutical bottle label information removal system 10 from ambient dust, debris, and various environmental elements. However, an outer body is not required as it is equally possible to operate the automated pharmaceutical bottle label information removal system 10 without the outer body or any other exterior housing element added. Another optional component is the dust cover. The dust cover, as described above, hinges down from the back to cover the opening where bottles are placed, but this element is also optional.

The automated pharmaceutical bottle label information removal system of the present disclosure generally works by powering up the system so that the heat bar comes up to a preset and thermostatically controlled temperature (the "preferred" or "desired" temperature). When the desired temperature is reached, an indicator light illuminates (e.g., green in color) to notify the user that operational mode is ready to go. The user may then place a pharmaceutical pill bottle in the automated pharmaceutical bottle label information removal system in approximate alignment on the roller wheels and press the start button. The automated pharmaceutical bottle label information removal system automatically aligns the bottle by lightly clamping the cap and lip (below the cap) against an alignment place. The adjustable jaws (two on each side) close around the bottle and the passive roller wheels of each set of jaws make contact with the bottle and press the bottle against the drive wheels. At runtime, the drive motor engages the gears (which include both driving gear and driven gear) and turns/rotates the bottle at a predetermined speed for a predetermined length of time. Once the bottle begins to rotate, the heat bar lifts and applies a set amount of pressure against the bottle. After the predetermined length of time ends, the heat bar retracts, the motor stops, and the jaws open up so that the passive roller wheels are no long in contact with the bottle, thereby allowing the bottle to be removed.

To make the automated pharmaceutical bottle label information removal system of the present disclosure, one may assemble the component by hand, for example, on an assembly line. Various parts/components may be manufactured prior to assembly. However, most of the components are available commercially. In particular, the motor, the heat bar, the LCD display screen, and the roller wheels are commercially available, off-the-shelf parts. The base would be stamped sheet metal or other durable material that offers some heat protection. The adjustable jaws and other components may be made from injection molded ABS plastic or similar material. Some or all of the optional parts may offer enhancements to the basic operational mode of the automated pharmaceutical bottle label information removal system. However, at its core, the automated pharmaceutical bottle label information removal system would be configured to simply apply the heat from the heat bar to rotating bottles, which are manually placed and removed. On the other hand, the automated pharmaceutical bottle label information removal system may include conveyance mechanisms to deliver bottle after bottle to the automated pharmaceutical bottle label information removal system for automatic placement on the rollers, followed by blackout redaction of the PHI on the label of the bottle, followed again by automatic popping out of the bottle after the label is entirely blackened out. This may continue automatically for multiple bottles (of various sizes and/or shapes) that are delivered to the automated pharmaceutical bottle label information removal system, such as by a conveyor belt or other delivery mechanism. In some embodiments, a number of bottles could be set via the LED display screen as a parameter ingested by the controller of the circuit board, with a counter keeping track on the number of remaining bottles to process before shutdown of the automated pharmaceutical bottle label information removal system is automatically triggered. Additionally, the layout of components could be modified such that the automated pharmaceutical bottle label information removal system could be set to process bottles in a horizontal orientation (as shown in the FIGS. 1-6) or in a vertical orientation. In particular, there may be efficiencies and fewer/different parts needed if the automated pharmaceutical bottle label information removal system is configured to operate in the vertical orientation. Also, there is potential for a handheld version of the automated pharmaceutical bottle label information removal system that allows for manually heating and removing information from labels, on a bottle-by-bottle basis. The handheld version would typically involve manual insert of each bottle, automatic heating and blackout redaction of the PHI on the label of the bottle, and manual removal of the bottle after processing.

To use the automated pharmaceutical bottle label information removal system of the present disclosure, a user would turn on the power button (e.g., in the rear of the unit) and wait for the heat bar to come up to the preferred temperature. When the preferred temperature is achieved, the ready-state will be indicated by one of the indicator lights (e.g., a green LED light) or via information visually output on the LED display screen (or both indicator light and LED display). The jaws will be opened (or will already be in an open configuration ready for placement of a bottle). Then the bottle would be placed horizontally on the rollers with cap toward the front of the automated pharmaceutical bottle label information removal system. In placing the bottle, a user would want to make sure the top of the cap and the lip under the cap are placed/sandwiched between the cap alignment plate and the U-shaped lip alignment plate. Then start operation by pressing the start button. This will begin operation to apply heat to the bottle while rotating the bottle automatically. When complete, the jaws will automatically open allowing for the bottle to be removed. If using the optional bottle ejector (plunger), the bottles will be pushed out the front of the automated pharmaceutical bottle label information removal system and down a chute for disposal. In that case, the spring-loaded alignment plate may have a hinge that folds down to provide space for the bottle to be ejected out and down the chute by the pressure applied to the bottom of the bottle by the plunger. Then the spring-loaded alignment plate would crank back into the upright position. If an optional hopper/feeder is used, bottles will be automatically aligned and loaded into the rollers of the automated pharmaceutical bottle label information removal system for processing. If an optional laser-eye or optical sensor is used then removal of label information will be verified and a tone will indicate that label was not erased and allow for bottle to be removed. The display screen will allow for adjustment of roller speed, time (duration of time that roller moving/heat applied), heater temperature, and optional accessories. Hour meter, bottle count, and current settings can also be viewed.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
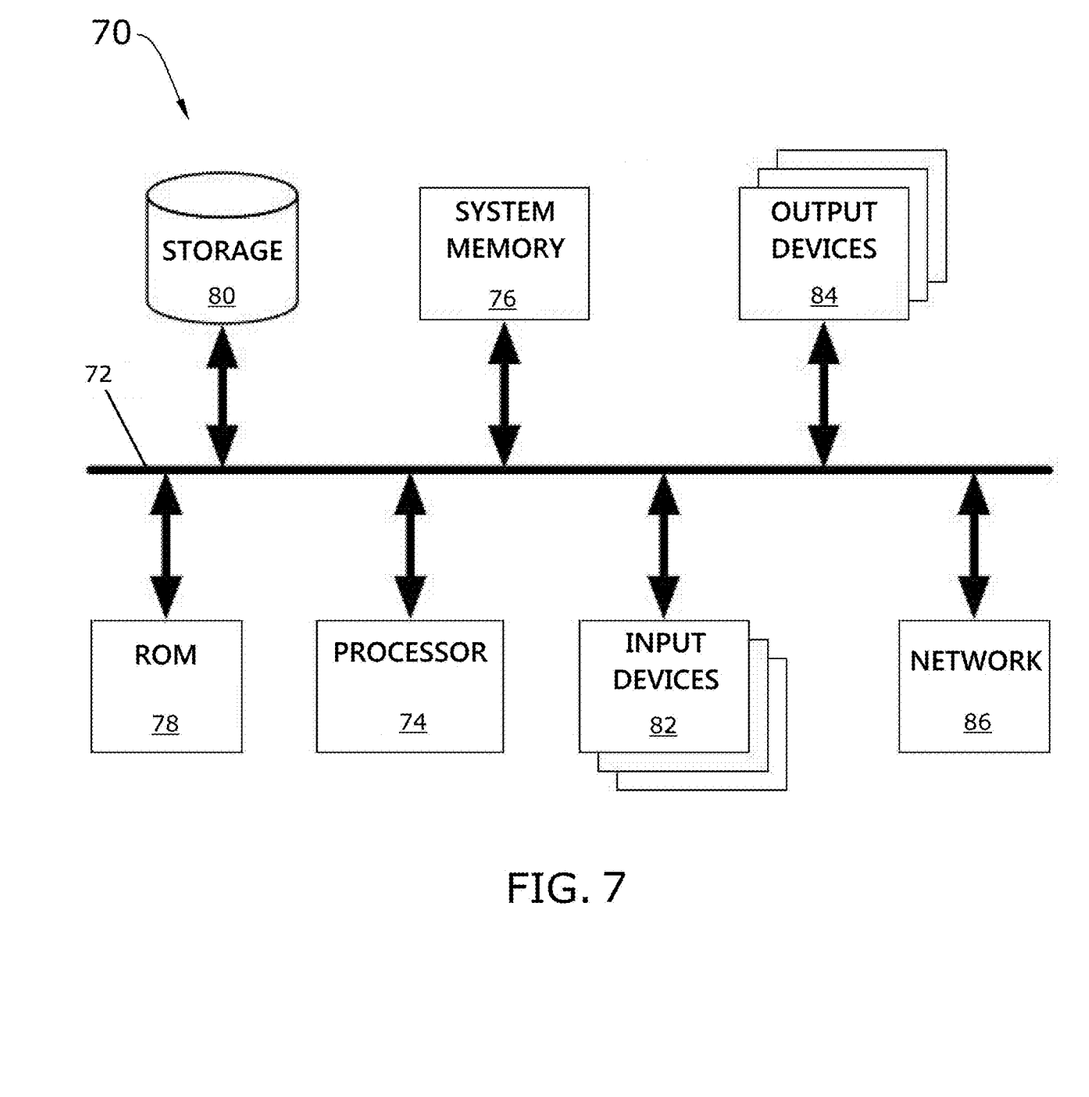
FIG. 7 conceptually illustrates an electronic system with which some embodiments of the invention are implemented.

By way of example, FIG. 7 conceptually illustrates an electronic system 70 with which some embodiments of the invention are implemented. The electronic system 70 may be a computer, phone, PDA, or any other sort of electronic device. Such an electronic system includes various types of computer readable media and interfaces for various other types of computer readable media. Electronic system 70 includes a bus 72, processing unit(s) 74, a system memory 76, a read-only memory 78, a permanent storage device 80, input devices 82, output devices 84, and a network 86.

The bus 72 collectively represents all system, peripheral, and chipset buses that communicatively connect the numerous internal devices of the electronic system 70. For instance, the bus 72 communicatively connects the processing unit(s) 74 with the read-only memory 78, the system memory 76, and the permanent storage device 80.

From these various memory units, the processing unit(s) 74 retrieves instructions to execute and data to process in order to execute the processes of the invention. The processing unit(s) may be a single processor or a multi-core processor in different embodiments.

The read-only-memory (ROM) 78 stores static data and instructions that are needed by the processing unit(s) 74 and other modules of the electronic system. The permanent storage device 80, on the other hand, is a read-and-write memory device. This device is a non-volatile memory unit that stores instructions and data even when the electronic system 70 is off. Some embodiments of the invention use a mass-storage device (such as a magnetic or optical disk and its corresponding disk drive) as the permanent storage device 80.

Other embodiments use a removable storage device (such as a floppy disk or a flash drive) as the permanent storage device 80. Like the permanent storage device 80, the system memory 76 is a read-and-write memory device. However, unlike storage device 80, the system memory 76 is a volatile read-and-write memory, such as a random access memory. The system memory 76 stores some of the instructions and data that the processor needs at runtime. In some embodiments, the invention's processes are stored in the system memory 76, the permanent storage device 80, and/or the read-only memory 78. For example, the various memory units include instructions for processing appearance alterations of displayable characters in accordance with some embodiments. From these various memory units, the processing unit(s) 74 retrieves instructions to execute and data to process in order to execute the processes of some embodiments.

The bus 72 also connects to the input and output devices 82 and 84. The input devices enable the user to communicate information and select commands to the electronic system. The input devices 82 include the buttons (both graphical and physical) for selecting options and navigating the information on the display screen 26C and, optionally, externally connected (via wired or wireless connection) keyboards and pointing devices (also called "cursor control devices"). The output devices 84 display information, such as alerts and notifications, configuration settings, sensor data such as temperature, etc., and other digital information generated by the electronic system 70. The output devices 84 include display devices, such as display screen 26C, and other optionally connecting devices such as printers, etc. As a display screen, such output devices are supportive of all types of digital displays including, without limitation, cathode ray tubes (CRT), liquid crystal displays (LCD), light emitting diode (LED) displays, and organic light emitting diode (OLED) displays, and their variations in the market. Some embodiments include devices such as the laser eye, which functions as both an output device (outputting a directed laser light) and an input device (receiving the reflected light back).

Finally, as shown in FIG. 7, bus 72 also couples electronic system 70 to a network 86 through a network adapter (not shown). In this manner, the computer can be a part of a network of computers (such as a local area network ("LAN"), a wide area network ("WAN"), or an intranet), or a network of networks (such as the Internet). Any or all components of electronic system 70 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An automated pharmaceutical bottle label information removal system comprising:
   a base platform;
   a plurality of spring loaded jaws connected to the base platform configured to open up in an open configuration to allow placement of a pill bottle and further configured to close down on the pill bottle placed in position for blackout redaction of personal health information (PHI) printed on a label attached to an external surface of the pill bottle;
   a plurality of rollers configured to rotate the pill bottle when the pill bottle is placed in position for blackout redaction of the PHI printed on the label;
   a motor attached to the base platform with a linear drive-line connected to a driving gear;
   a driven gear connected to the driving gear and a first roller in the plurality of rollers, wherein the driven gear is configured to rotate the first roller when the motor turns the drive-line connected to the driving gear, wherein a second roller in the plurality of rollers rotates as the pill bottle rotates;
   a thermostatically controlled heat bar that heats up to a preferred temperature configured to obscure the PHI printed on the label of the pill bottle;
   an LED display screen configured to visually output information while performing blackout redaction of the PHI printed on the label of the pill bottle;
   a power switch to toggle power on and off;
   a plurality of indicator lights that illuminate to indicate a state of a plurality of critical components, wherein the plurality of critical components comprise the heat bar and a particular indicator light that illuminates in a first color when temperature of the heat bar is below a preferred temperature, in a second color when the temperature of the heat bar is at the preferred temperature, and in a third color when the temperature of the heat bar is above the preferred temperature;
   a start button which, when turned on, is configured to start blackout redaction of the PHI printed on the label of the pill bottle;
   a spring-loaded alignment plate for securing a top lid of the pill bottle;
   a U-shaped alignment plate for securing a bottom lip portion of the top lid of the pill bottle
   an audio speaker configured to audibly output one or more of an audio alarm, a tone, and an automated voice prompting to indicate a status; and
   a plurality of rubberized feet under the base platform to elevate the base platform above a ground surface.

2. The automated pharmaceutical bottle label information removal system of claim 1, wherein the plurality of spring loaded jaws comprises four spring-loaded jaws, wherein each spring-loaded jaw in the plurality of spring loaded jaws comprises a plurality of passive roller wheels configured to contact the pill bottle in the closed configuration.

3. The automated pharmaceutical bottle label information removal system of claim 1, wherein the thermostatically controlled heat bar comprises a silicone sheet that covers an outer surface of the heat bar.

4. The automated pharmaceutical bottle label information removal system of claim 1, wherein the information visually output onto the LED display screen comprises one or more of operational status information, rolling speed data, and heat bar temperature data.

5. The automated pharmaceutical bottle label information removal system of claim 1 further comprising scroll buttons for display and adjusting speed of the rollers and temperature of the heat bar.

6. The automated pharmaceutical bottle label information removal system of claim 1 further comprising a plunger to automatically kick the pill bottle into a collection container after blackout redaction of the PHI printed on the label is completed.

7. The automated pharmaceutical bottle label information removal system of claim 6 further comprising a chute to direct the pill bottle kicked out by the plunger into the collection container.

8. The automated pharmaceutical bottle label information removal system of claim 7, wherein the spring-loaded alignment plate comprises a hinge to lower a top portion of the alignment plate to open an area for ejection of the pill bottle by the plunger.

9. The automated pharmaceutical bottle label information removal system of claim 1 further comprising a fan to help prevent overheating and maintain function.

10. The automated pharmaceutical bottle label information removal system of claim 9, further comprising a back alignment plate, wherein the fan comprises a vented fan along the back alignment plate.

* * * * *